US012626978B2

(12) United States Patent
Hwang et al.

(10) Patent No.: US 12,626,978 B2
(45) Date of Patent: May 12, 2026

(54) POUCH TYPE RECHARGEABLE-BATTERY

(71) Applicant: SK On Co., Ltd., Seoul (KR)

(72) Inventors: Ho Jin Hwang, Daejeon (KR); Young Ha Kim, Daejeon (KR); Ji Hyung Kim, Daejeon (KR); Sang Bin Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 773 days.

(21) Appl. No.: 17/829,782

(22) Filed: Jun. 1, 2022

(65) Prior Publication Data

US 2023/0099793 A1 Mar. 30, 2023

(30) Foreign Application Priority Data

Sep. 29, 2021 (KR) ........................ 10-2021-0128770

(51) Int. Cl.
H01M 50/105 (2021.01)
H01M 10/0525 (2010.01)
(Continued)

(52) U.S. Cl.
CPC ..... H01M 50/178 (2021.01); H01M 10/0525 (2013.01); H01M 50/105 (2021.01); H01M 50/186 (2021.01)

(58) Field of Classification Search
CPC ............. H01M 50/178; H01M 50/186; H01M 50/105; H01M 50/172; H01M 50/183;
(Continued)

(56) References Cited

U.S. PATENT DOCUMENTS

2004/0029001 A1* 2/2004 Yamazaki ........... H01M 50/124
429/185
2009/0311592 A1 12/2009 You et al.
(Continued)

FOREIGN PATENT DOCUMENTS

KR 10-2007-0102768 A 10/2007
KR 10-2017-0052061 A 5/2017
(Continued)

OTHER PUBLICATIONS

Extended European Search Report for the European Patent Application No. 22176317.0 issued by the European Patent Office on Nov. 22, 2022.

*Primary Examiner* — Osei K Amponsah
(74) *Attorney, Agent, or Firm* — IP & T GROUP LLP

(57) ABSTRACT

A pouch-type secondary battery includes an electrode assembly including a first electrode plate, a separator, and a second electrode plate; and a pouch film in which the electrode assembly is accommodated, wherein the pouch film includes an accommodation portion in which the electrode assembly is accommodated, and a terrace portion extending from the accommodation portion to an outside of the accommodation portion, the terrace portion includes a first side portion through and from which a negative electrode lead connected to the electrode assembly passes and protrudes, a second side portion through and from which a positive electrode lead connected to the electrode assembly passes and protrudes, and an upper end portion having both end portions connected to the first and second side portions, and folding portions folded toward the upper end portion are provided on ends of the first and second side portions.

5 Claims, 4 Drawing Sheets

(51) Int. Cl.
    *H01M 50/178*     (2021.01)
    *H01M 50/186*     (2021.01)
(58) Field of Classification Search
    CPC ... H01M 50/20; H01M 10/0525; H01M 10/46
    See application file for complete search history.

(56) References Cited

U.S. PATENT DOCUMENTS

| | | |
|---|---|---|
| 2017/0279093 A1 | 9/2017 | Park |
| 2018/0219245 A1 | 8/2018 | Choi et al. |
| 2020/0136106 A1 | 4/2020 | Johnson et al. |
| 2020/0185668 A1* | 6/2020 | Levin .................. H01M 50/119 |
| 2020/0365836 A1* | 11/2020 | Jung .................. H01M 50/548 |
| 2021/0098753 A1 | 4/2021 | Kang et al. |

FOREIGN PATENT DOCUMENTS

| | | |
|---|---|---|
| KR | 10-2021-0038230 A | 4/2021 |
| WO | 2019/121332 A1 | 6/2019 |

\* cited by examiner

POUCH TYPE RECHARGEABLE-BATTERY

CROSS-REFERENCE TO RELATED APPLICATION(S)

This application claims benefit of priority to Korean Patent. Application No. 10-2021-0128770 filed on Sep. 29, 2021 in the Korean intellectual Property Office, the disclosure of which is incorporated herein by reference in its entirety.

BACKGROUND

1. Field

The present disclosure relates to a pouch-type rechargeable battery.

2. Description of Related Art

A pouch-type secondary battery may be classified as a unidirectional pouch-type secondary battery or a bidirectional pouch-type secondary battery, according to directivity of an electrode lead, and may be classified as a three-sided sealing pouch-type secondary battery or a four-sided sealing pouch-type secondary battery, according to the number of sealing surfaces thereof.

Meanwhile, in the three-sided sealing pouch-type secondary battery, both ends of a non-sealing surface may protrude, an arrangement which may be generally known by various names such as a shark-fin, a bat ear, or the like.

Meanwhile, a plurality of pouch-type secondary batteries may be accommodated in a case or the like to be manufactured as a secondary battery module and a secondary battery pack.

However, when the secondary battery module or the secondary battery pack is manufactured, due to the above-described protrusion, there may be problems in that a volume density thereof is lowered, and, furthermore, cooling efficiency thereof may be lowered.

SUMMARY

An aspect of the present disclosure is to provide a pouch-type secondary battery removing a protrusion.

According to an aspect of the present disclosure, a pouch-type secondary battery includes an electrode assembly including a first electrode plate, a separator, and a second electrode plate; and a pouch film in which the electrode assembly is accommodated, wherein the pouch film includes an accommodation portion in which the electrode assembly is accommodated, and a terrace portion extending from the accommodation portion to an outside of the accommodation portion, the terrace portion includes a first side portion through and from which a negative electrode lead connected to the electrode assembly passes and protrudes, a second side portion through and from which a positive electrode lead connected to the electrode assembly passes and protrudes, and an upper end portion having both end. portions connected to the first and second side portions, and folding portions folded toward The upper end portion are provided on ends of the first and second side portions.

The folding portion may be folded on an inside of the terrace portion in which the pouch film overlaps.

A longitudinal cross-section of the terrace portion in a region in which each of the folding portions may be disposed may have a 'Σ' shape.

The pouch film may have a bottom surface contacting one side surface of the electrode assembly and disposed on an opposite side of the upper end portion, and auxiliary folding portions extending from both ends of the bottom surface and connected to the folding portions may be provided.

The auxiliary folding portions may be folded toward both end portions of the electrode assembly.

A sealing portion sea Thing the pouch film may be provided on the first and second side portions and the upper end portion.

A sealing member disposed between the folding portions may be further included.

The sealing member may be formed of an adhesive.

The sealing member may be an implant for bonding the sealing portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
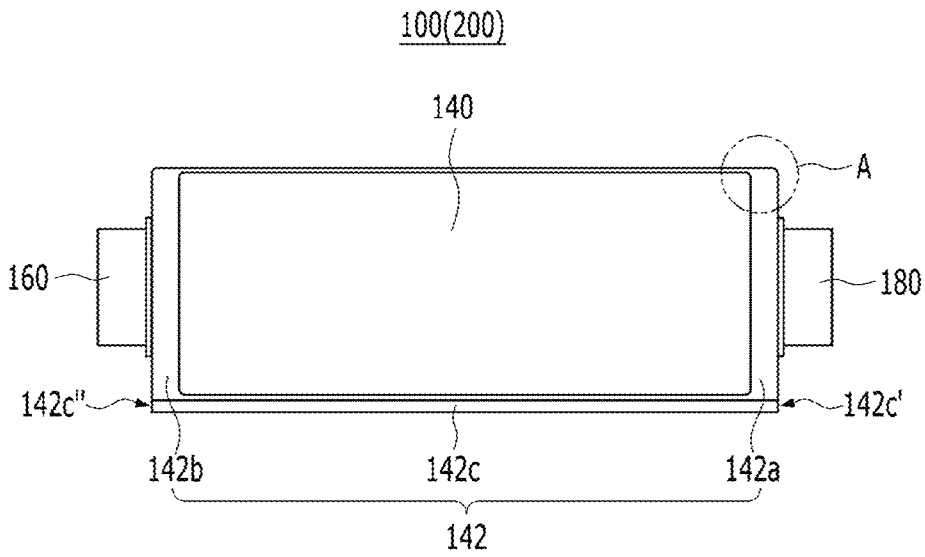
FIG. 1 is a perspective view illustrating a pouch-type secondary battery according to an embodiment of the present disclosure.

Hereinafter, embodiments of the present disclosure will be described with reference to specific embodiments and the accompanying drawings. However, the embodiments of the present disclosure can be modified to have various other forms, and the scope of the present disclosure is not limited to the embodiments described below. Furthermore, the embodiments of the present disclosure are provided to more full describe the present disclosure to those skilled in the art. Therefore, the shapes and sizes of the elements in the drawings may be exaggerated for clarity of description, and the elements denoted by the same reference numerals in the drawings are the same elements.

Figure 2:
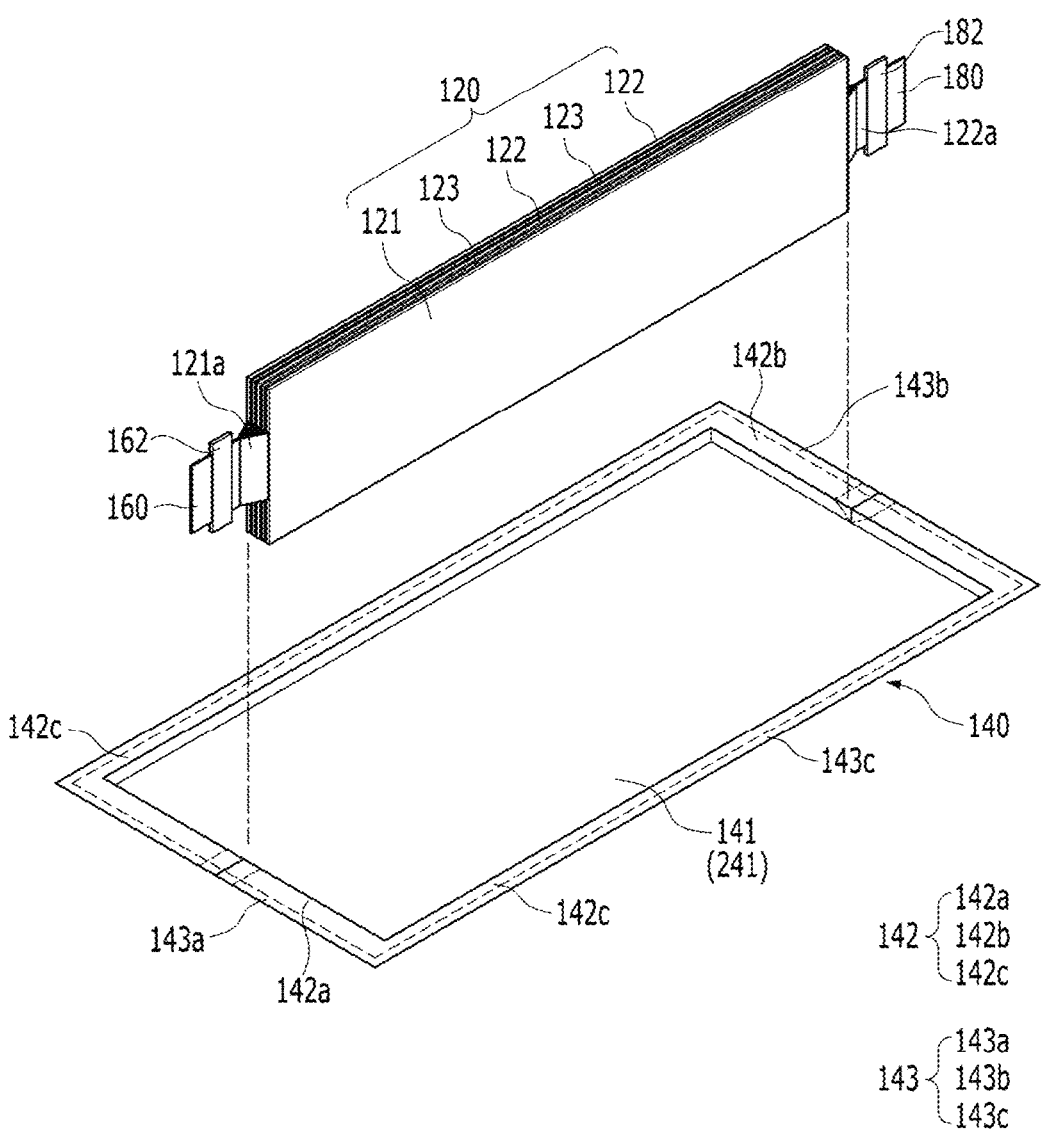
FIG. 2 is an exploded perspective view illustrating a pouch-type secondary battery according to an embodiment of the present disclosure.
Figure 3:
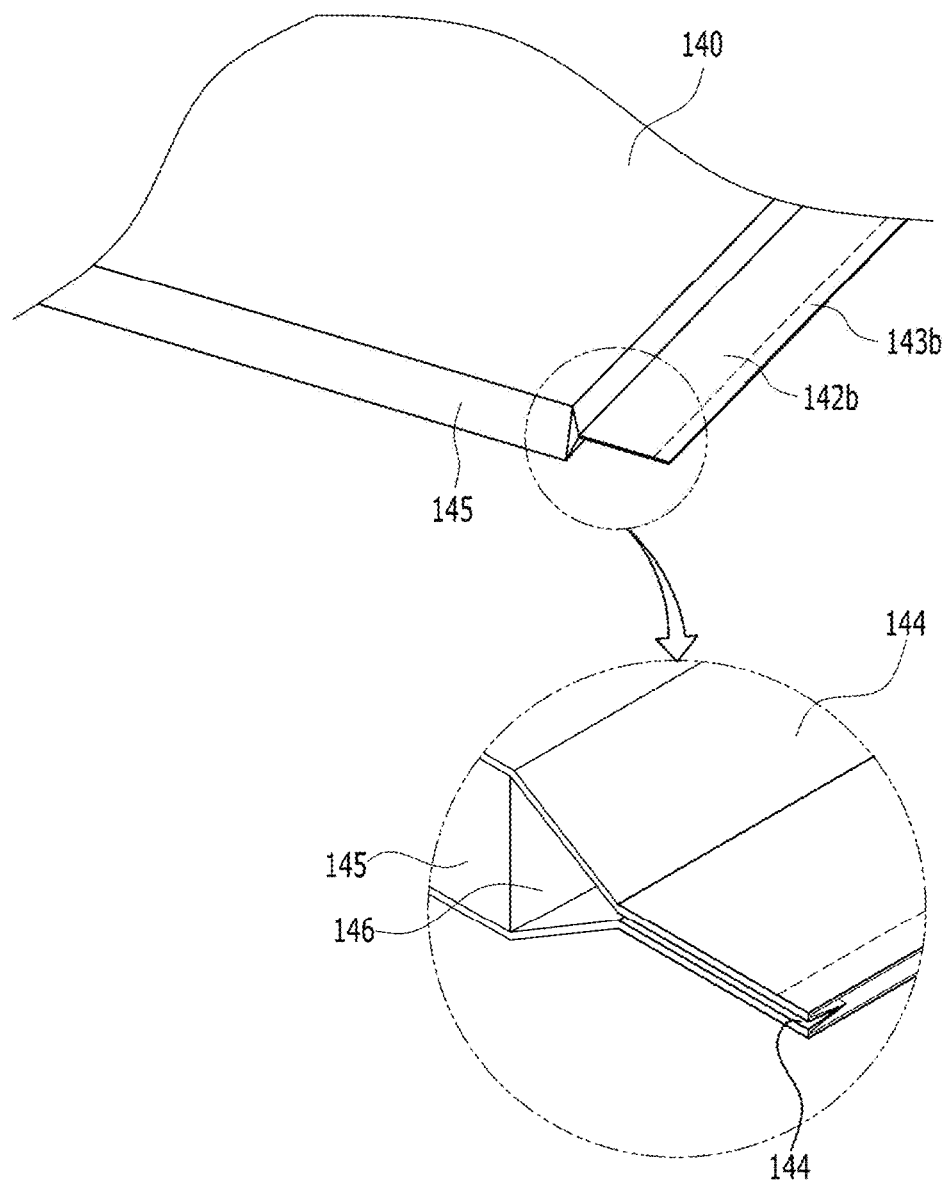
FIG. 3 is an enlarged view illustrating portion A of FIG.

FIG. 1 is a perspective view illustrating a pouch-type secondary battery according to an embodiment of the present disclosure, FIG. 2 is an exploded perspective view illustrating a pouch-type secondary battery according to an embodiment of the present disclosure and FIG. 3 is an enlarged view illustrating portion A of FIG. 1.

Referring to FIGS. 1 to 3, a pouch-type secondary battery 100 according to an embodiment of the present disclosure may be configured to include, as an example, an electrode assembly 120, a pouch film 140, a negative electrode lead 160, and a positive electrode lead 180.

The electrode assembly 120 may be accommodated in an internal space formed by the pouch film 140. As an example, the electrode assembly 1.20 may include a first electrode plate 121, a second electrode plate 122, and a separator 123, formed in a thin plate shape or a film shape, and may be formed in various forms as needed, such as a stack type, a wound type, or the like. For example, the first electrode plate 121 may serve as a negative electrode, and the second electrode plate 122 may serve as a positive electrode.

The first electrode plate 121 may be formed by, for example, coating a first electrode active material such as graphite, carbon, or the like on a first electrode current collector formed of a metal foil such as copper, a copper alloy, nickel, or a nickel alloy. In addition, the first electrode plate 121 may include a first electrode uncoated region 121a that may be a region in which the first electrode active material is riot applied. The first electrode uncoated region 121a may serve as a path for current flow between the first electrode plate 121 and an outside of the first electrode plate 121.

The second electrode plate 122 may be formed by, for example, coating a second electrode active material such as a transition metal oxide or the like on a second electrode current collector formed of a metal foil such as aluminum or an aluminum alloy. In addition, the second electrode plate 122 may include a second electrode uncoated region 122a that may be a region in which the second electrode active material is not applied. The second electrode uncoated region 122a may also serve as a path for current flow between the second electrode plate 122 and an outside of the second electrode plate 122.

The separator 123 may be located between the first electrode plate 121 and the second electrode plate 122, to prevent a short circuit and to enable movement of lithium ions.

For example, the separator 123 may be formed of polyethylene, polypropylene, or a composite film of polyethylene and polypropylene.

As an example, the first electrode plate 121, the second electrode plate 122, and the separator 123 may be arranged in a height direction of a lower case. For example, the first electrode plate 121, the separator 123, and the second electrode plate 122 may be alternately stacked in the order from a bottom surface of the lower case in an upward direction.

The negative electrode lead 160 may be connected to the first electrode uncoated region 121a of the first electrode plate 121, and the positive electrode lead 180 may be connected to the second electrode uncoated region 122a of the second electrode plate 122.

The pouch film 140 may accommodate the electrode assembly 120 therein, and the negative electrode lead 160 and the positive electrode lead 180 may be arranged to protrude from both sides of the pouch film 140.

An accommodation portion 141 may be formed in the pouch film 140. In addition, a bottom surface of the accommodation port iron 141 may be formed to be flat. In addition, the electrode assembly 120 may be inserted into the accommodation portion 141, and the pouch film 140 may be folded around one surface of the electrode assembly 120.

In addition, the pouch film 140 may include a terrace portion 142 formed to extend toward an outside of the accommodation portion 141. As an example, the terrace portion 142 may be formed to extend from three (3) side surfaces of the accommodation portion 141. As an example, the terrace portion 142 may include a first side portion 142a through and from which the negative electrode lead 160 connected to the electrode assembly 120 passes and protrudes, a second side portion 142b through and from which the positive electrode lead 180 connected to the electrode assembly 120 passes and protrudes, and an upper end portion 142c having both end portions (142c', 142c'') connected to the first and second side portions 142a and 142b.

As an example, as illustrated in FIG. 1, the upper end portion 142c may be folded after forming a sealing portion 143 to be described later.

A sealing portion. 143 may be provided in a portion of edges of the terrace portion 142. As an example, the sealing portion 143 may include a first side sealing portion 143a, a second side sealing portion 143b, and an upper sealing portion 143c. In this case, in the pouch-type secondary battery 100, the electrode assembly 120 may be accommodated by folding the accommodation portion 141, portions of the first and second side sealing portions 143a and 143b, except for the upper sealing portion 143c, may be bonded to each other, an electrolyte may be injected through a region in which the upper sealing portion 143c is disposed, and a sealing process may be then performed. In this manner, three (3) edges among four (4) edges of the pouch-type secondary battery 100 may be sealed. For example, the sealing portion 143 including the first side sealing portion 143a, the second side sealing portion 143b, and the upper sealing portion 143c may be formed in an edge of the terrace portion 142.

Also, the terrace portion 142 may have a width, wider than a width of the sealing portion 143. The sealing portion 143 means a region bonded by, for example, thermal fusion in the terrace portion 142, and the terrace portion 142 except for the sealing portion 143 may maintain an unbonded state.

The electrolyte may be formed by adding a lithium salt such as $LiPF_6$, $LiBF_4$, or the like in an organic solvent such as ethylene carbonate (EC), propylene carbonate (PC), diethyl carbonate (DEC), ethylmethyl carbonate (EMC) dimethyl carbonate (DMC), or the like. In addition, the electrolyte may be in a liquid phase or a gel phase.

Also, the pouch film 140 may be formed as a laminate sheet including a metal layer and a resin layer. In particular, the laminate sheet may be an aluminum laminate sheet. As an example, the pouch film 140 may include a core portion formed of a metal as a material, a heat-fused layer formed on an upper surface of the core portion, and an insulating film formed on a lower surface of the core portion.

The heat-fused layer may use a polymer resin, such as modified polypropylene, for example, cast polypropylene (CPP) to act as an adhesive layer, and the insulating film may be formed of a resin material such as nylon or polyethylene terephthalate (PET), but a structure and a material of the pouch film are not limited.

Folding, portions 144 folded toward the upper end portion 142c may be provided on ends of the first and second side portions 142a and 142b . The folding portions 144 may be folded on an inside of the terrace portion 142 in which the pouch film 140 overlaps. As an example, a longitudinal cross-section of the terrace portion 142 in a region in which each of the folding portions 144 is disposed may have a 'Σ' shape.

In addition, the pouch film 140 may have a bottom surface 145 contacting one side surface of the electrode assembly 120 and disposed on an opposite side of the upper end portion 142c, and auxiliary folding portions 146 extending from both ends of the bottom surface 145 and connected to the folding portions 144 may be provided. The auxiliary folding portions 146 may be folded toward both end portions of the electrode assembly 120. For example, the auxiliary folding portions 146 may not form a protrusion folded toward the terrace portion 142 to protrude from the bottom surface 145.

For example, the folding portions 144 and the auxiliary folding portions 146 may be formed by folding portions represented by tangent lines of FIG. 2, when the pouch film 140 is folded based on a center line before forming the sealing portion 143 of the terrace portion 142. When the folding portions 144 and the auxiliary folding portions 146 are not provided, and the pouch film 140 is folded in a state in which one surface of the electrode assembly 120 is in contact with the accommodation portion 141 of the pouch film 140, a protrusion may be formed due to a step difference between the accommodation portion 141 and the terrace portion 142. A portion of the accommodation portion 141 may be folded by the folding portions 144 and the auxiliary folding portions 146, to form the folding portions 144 extending from the auxiliary folding portions 146. In this case, a protrusion protruding from the bottom surface 145 may not be formed.

In this manner, since the folding portions 144 may be provided on the terrace portion 142 and the auxiliary folding portions 146 extending from the bottom surface 145 may be provided in the pouch film 140, a protrusion (e g a shark-fin, a bat ear, or the like) may not be formed, when forming the sealing portion 143.

The negative electrode lead 160 may be electrically connected to the first electrode uncoated portion 121a of the first electrode plate 121, and one end portion of the negative electrode lead 160 may be disposed to protrude from the pouch film 140. As an example, the negative electrode lead 160 may be formed of copper, a copper alloy, nickel, or a nickel alloy material, which may be the same material as that of the first electrode plate 121. The negative electrode lead 160 may be connected to the first electrode plate 121 through a current collector (not illustrated). In addition, the negative electrode lead 160 and the current collector may be bonded by welding. As an example, a sealing film 162 may be installed on the negative electrode lead 160, and the sealing film may be disposed in the first side sealing portion 143a.

The positive electrode lead 180 may be electrically connected to the second electrode uncoated portion 122a of the second electrode plate 122, and one end portion of the positive electrode lead 180 may be disposed to protrude from the pouch film 140. As an example, the positive electrode lead 180 may be formed of aluminum or an aluminum alloy material, which may be the same material as that of the second electrode plate 122. Also, the positive electrode lead 180 may be connected to the second electrode plate 122 through a current collector (not illustrated). The positive electrode lead 180 and the current collector may be bonded by welding. As an example, a sealing film 182 may be installed on the positive electrode lead 180, and the sealing film may be disposed in the second side sealing portion 143b.

As described above, since the folding portions 144 may be provided on the terrace portion 142 and the auxiliary folding portions 146 extending from the bottom surface 145 may be provided in the pouch film 140, a protrusion (e.g., a shark-fin, a bat ear, or the like) may not be formed, when forming the sealing portion 143.

Figure 4:
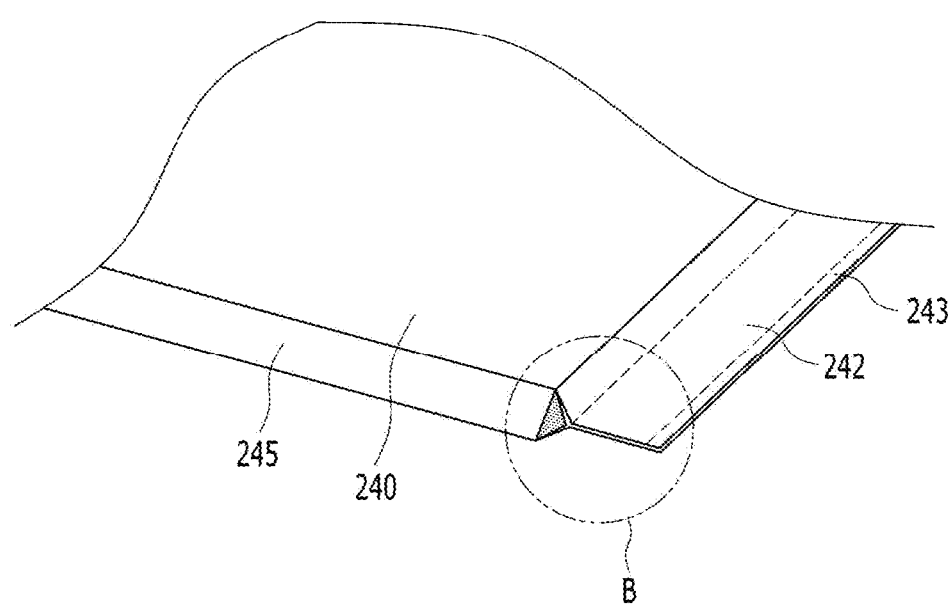
FIG. 4 is a perspective view illustrating a modified embodiment of a pouch-type secondary battery according to an embodiment of the present disclosure.
Figure 5:
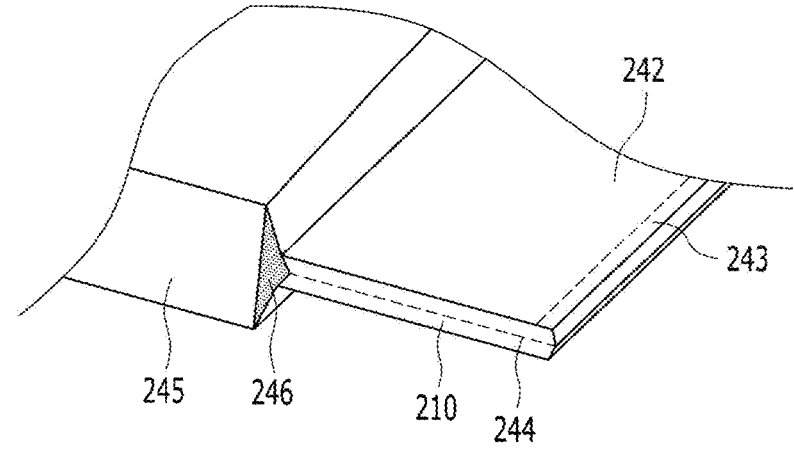
FIG. 5 is an enlarged view illustrating portion B of FIG.

FIG. 4 is a perspective view illustrating a modified embodiment of a pouch-type secondary battery according to an embodiment of the present disclosure, and FIG. 5 is an enlarged view illustrating portion B of FIG. 4.

Referring to FIGS. 4 and 5, a pouch-type secondary battery 200 according to an embodiment of the present disclosure may include a pouch film 240. The pouch-type secondary battery 200 may include an electrode assembly 120, a negative electrode lead 160, and a positive electrode lead 180, as described above. Since the electrode assembly 120, the negative electrode lead 160 and the positive electrode lead 180 may be substantially the same as those described above, detailed descriptions thereof and illustrations thereof in the drawings will be omitted.

An accommodation portion 241 (not illustrated, see FIG. 2) may be formed in the pouch film 240. In addition, a bottom surface of the accommodation portion 241 may be formed to be flat. In addition, the electrode assembly 120 (refer to FIG. 2) may be inserted into the accommodation portion 241, and the pouch film 240 may be folded around one surface of the electrode assembly 120.

In addition, the pouch film 240 may include a terrace portion 242 formed to extend toward an outside of the accommodation portion 241. As an example, the terrace portion 242 maybe formed to extend from three (3) side surfaces of the accommodation portion 241.

A sealing portion 243 may be provided in a portion of edges of the terrace portion 242. As an example, in the pouch-type secondary battery 200, three (3) edges among four (4) edges may be sealed.

In addition, the terrace portion 242 may have a width, wider than a width of the sealing portion 243. The sealing portion 243 means a region bonded by, for example, thermal fusion in the terrace portion 242, and the terrace portion 242 except for the sealing portion 243 may maintain an unbonded state.

The electrolyte may be formed by adding a lithium salt such as $LiPF_6$, $LiBF_4$, or the like to an organic solvent such as ethylene carbonate (EC), propylene carbonate (PC), diethyl carbonate (DEC), ethylmethyl carbonate (EMC), dimethyl carbonate (DMC), or the like. In addition, the electrolyte may be in a liquid phase or a gel phase.

Also, the pouch film 240 may be formed as a Laminate sheet including a metal layer and a resin. In particular, the laminate sheet may be an aluminum laminate sheet. As an example, the pouch film 240 may include a core portion formed of a metal as a material, a heat-fused layer formed on an upper surface of the core portion, and an insulating film formed on a lower surface of the core portion.

The heat-fused layer may use a polymer resin, such as modified polypropylene, for example, cast polypropylene (CPP) to act as an adhesive layer, and the insulating film may be formed of a resin material such as nylon or polyethylene terephthalate (PET), but a structure and a material of the pouch film are not limited.

Folding portions 244 folded in an upward direction may be provided on the terrace portion 242. The folding portions 244 may be folded on an inside of the terrace portion 242 in which the pouch film 240 overlaps As an example, a longitudinal cross-section of the terrace portion 242 in a region in which each of the folding portions 244 is disposed may have a 'Σ' shape.

In addition, the pouch film 240 may have a bottom surface 245 contacting one de surface of the electrode assembly 120, and auxiliary folding portions 246 extending from both ends of the bottom surface 245 and connected to the folding portions 244 may be provided. The auxiliary folding portions 246 may be folded toward both end portions of the electrode assembly 120. For example, the auxiliary folding portions 246 may not form a protrusion folded toward the terrace portion 242 to protrude from the bottom surface 245.

A sealing member 210 may be provided in the folding portions 244 and the auxiliary folding portions 246. Therefore, a bonding force lowered by the folding portions 244 and the auxiliary folding portions 246 may be supplemented. As an example, the sealing member 210 may be an adhesive.

In this embodiment, the sealing member 210 maybe formed of an adhesive in the folding portions 244 and the auxiliary folding portions 246. Although a case in which an adhesive is filled is illustrated, but the present disclosure is not limited thereto. Instead of the adhesive, an implant may be disposed on the folding portions 244 and the auxiliary folding portions 246.

In this manner, since the folding portions 244 may be provided on the terrace portion 242 and the auxiliary folding portions 246 extending from the bottom surface 245 may be provided in the pouch film 240, a protrusion (e.g., a shark-fin, a bat ear, or the like) may not be formed, when forming the sealing portion 243.

According to an embodiment of the present disclosure, an effect of removing a protrusion may be provided.

While example embodiments have been illustrated and described above, it will be apparent to those skilled in the art that modifications and variations could be made without departing from the scope of the present disclosure as defined by the appended claims.

What is claimed is:

1. A pouch-type secondary battery comprising:
an electrode assembly including a first electrode plate, a separator, and a second electrode plate; and
a pouch film in which the electrode assembly is accommodated,
wherein the pouch film includes
an accommodation portion in which the electrode assembly is accommodated,
a terrace portion extending from the accommodation portion to an outside of the accommodation portion,
wherein the terrace portion includes a first side portion through and from which a negative electrode lead connected to the electrode assembly passes and protrudes, a second side portion through and from which a positive electrode lead connected to the electrode assembly passes and protrudes, and an upper end portion having both end portions connected to the first and second side portions,
a bottom surface contacting one side surface of the electrode assembly and disposed on an opposite side of the upper end portion,
folding portions folded toward the upper end portion are provided on ends of the first and second side portions,
auxiliary folding portions extending from both ends of the bottom surface and connected to the folding portions are provided, and
a sealing member disposed between the folding portions and the auxiliary folding portions on an outside surface of the folded pouch film,
wherein the sealing member is formed of an adhesive.

2. The pouch-type secondary battery of claim 1, wherein the folding portions are folded on an inside of the terrace portion in which the pouch film overlaps.

3. The pouch-type secondary battery of claim 2, wherein a longitudinal cross-section of the terrace portion in a region in which each of the folding portions is disposed has a 'Σ' shape.

4. The pouch-type secondary battery of claim 1, wherein the auxiliary folding portions are folded toward both end portions of the electrode assembly.

5. The pouch-type secondary battery of claim 1, wherein a sealing portion sealing the pouch film is provided on the first and second side portions and the upper end portion.

* * * * *